United States Patent [19]

van der Lely et al.

[11] Patent Number: 5,275,124
[45] Date of Patent: * Jan. 4, 1994

[54] MILKING APPARATUS

[75] Inventors: Edwin van der Lely, Weverskade;
Karek van den Berg,
Boterbloemstraat; Rene Fransen,
Prins Hendriklaan, all of Netherlands

[73] Assignee: C. van der Lely N.V., Maasland, Netherlands

[*] Notice: The portion of the term of this patent subsequent to Jan. 14, 2009 has been disclaimed.

[21] Appl. No.: 916,728

[22] Filed: Jul. 22, 1992

Related U.S. Application Data

[63] Continuation of Ser. No. 818,764, Jan. 13, 1992, Pat. No. 5,195,456, which is a continuation-in-part of Ser. No. 485,579, Feb. 27, 1990, Pat. No. 5,080,040.

[30] Foreign Application Priority Data

Feb. 27, 1989 [NL] Netherlands .......................... 8900479

[51] Int. Cl.$^5$ ............................................... A01J 9/04
[52] U.S. Cl. ................................. 119/14.08; 119/14.09
[58] Field of Search ............... 119/14.09, 14.02, 14.03, 119/14.08, 14.14, 14.18, 14.47, 14.55

[56] References Cited

U.S. PATENT DOCUMENTS

| | | | |
|---|---|---|---|
| 3,195,589 | 7/1965 | Houda, Jr. | |
| 3,289,633 | 12/1966 | Simons | |
| 3,538,768 | 11/1970 | Duncan | |
| 3,874,337 | 4/1975 | Unbaugh et al. | 119/14.15 |
| 3,989,009 | 11/1976 | Robar et al. | 119/14.08 |
| 4,013,043 | 3/1977 | Kirwan | 119/14.09 |
| 4,064,838 | 12/1977 | Mukarovsky | 119/14.08 |
| 4,095,920 | 6/1978 | Needham et al. | 417/12 |
| 4,231,324 | 11/1980 | Schietter | 119/14.17 |
| 4,325,028 | 4/1982 | Takahashi | 119/14.14 |
| 4,351,271 | 9/1982 | Mueller et al. | 119/14.09 |
| 4,385,590 | 5/1983 | Mortensen | 119/14.14 |
| 4,574,736 | 3/1986 | Tanaka et al. | 119/14.08 |
| 5,080,040 | 1/1992 | van der Lely | 119/14.14 |

FOREIGN PATENT DOCUMENTS

| | | | |
|---|---|---|---|
| 0277396 | 12/1978 | European Pat. Off. | |
| 42801 | 5/1991 | European Pat. Off. | 119/14.08 |
| 1348721 | 10/1987 | U.S.S.R. | 119/14.08 |
| 2055543 | 3/1981 | United Kingdom | |
| 2182534 | 5/1987 | United Kingdom | 119/14.08 |

*Primary Examiner*—John G. Weiss
*Attorney, Agent, or Firm*—Penrose Lucas Albright

[57] ABSTRACT

A milking plant for cows is provided with a milking machine comprising teat cups, which are connected separately to the teats of an animal. The milk obtained from each udder quarter is conveyed through a separate line to a milk measuring device. The milk measuring device includes four milk meters, one for each teat cup, having separate discharge lines coupled to common discharge lines which connect with a circulation line or loop that includes a bulk milk cooling tank, a two-speed or variable speed pump, and a plurality of heat exchangers for precooling the milk received from the common discharge lines before it is received in the bulk milk cooling tank and to recirculate and cool the milk received in the bulk milk cooling tank. After the milk has been discharged from the bulk milk cooling tank and the system is to be disinfected, washed and rinsed, the heat exchangers being used in a heat pump arrangement, can heat the fluid therein as selected and desired for sanitizing the system.

13 Claims, 4 Drawing Sheets

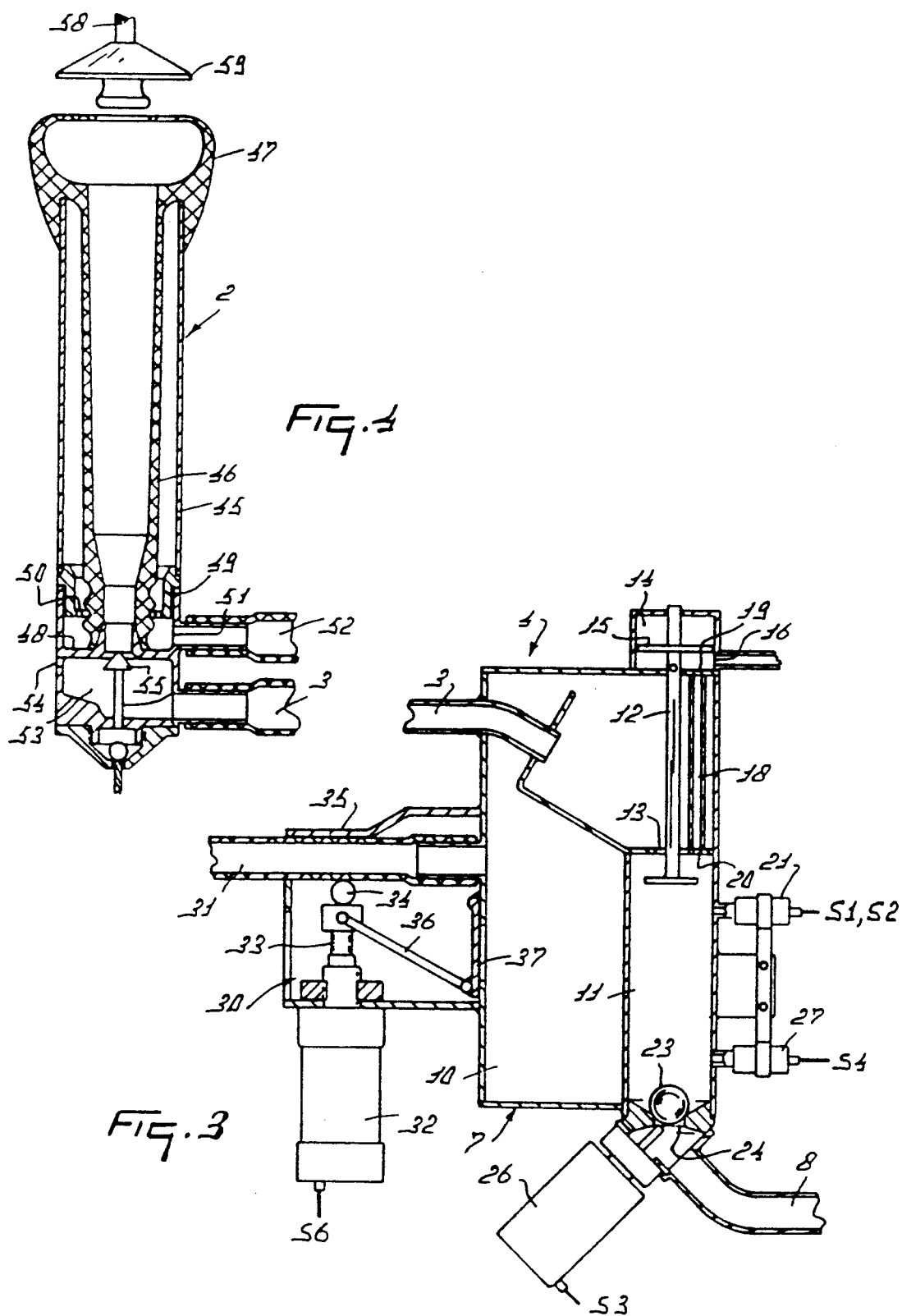

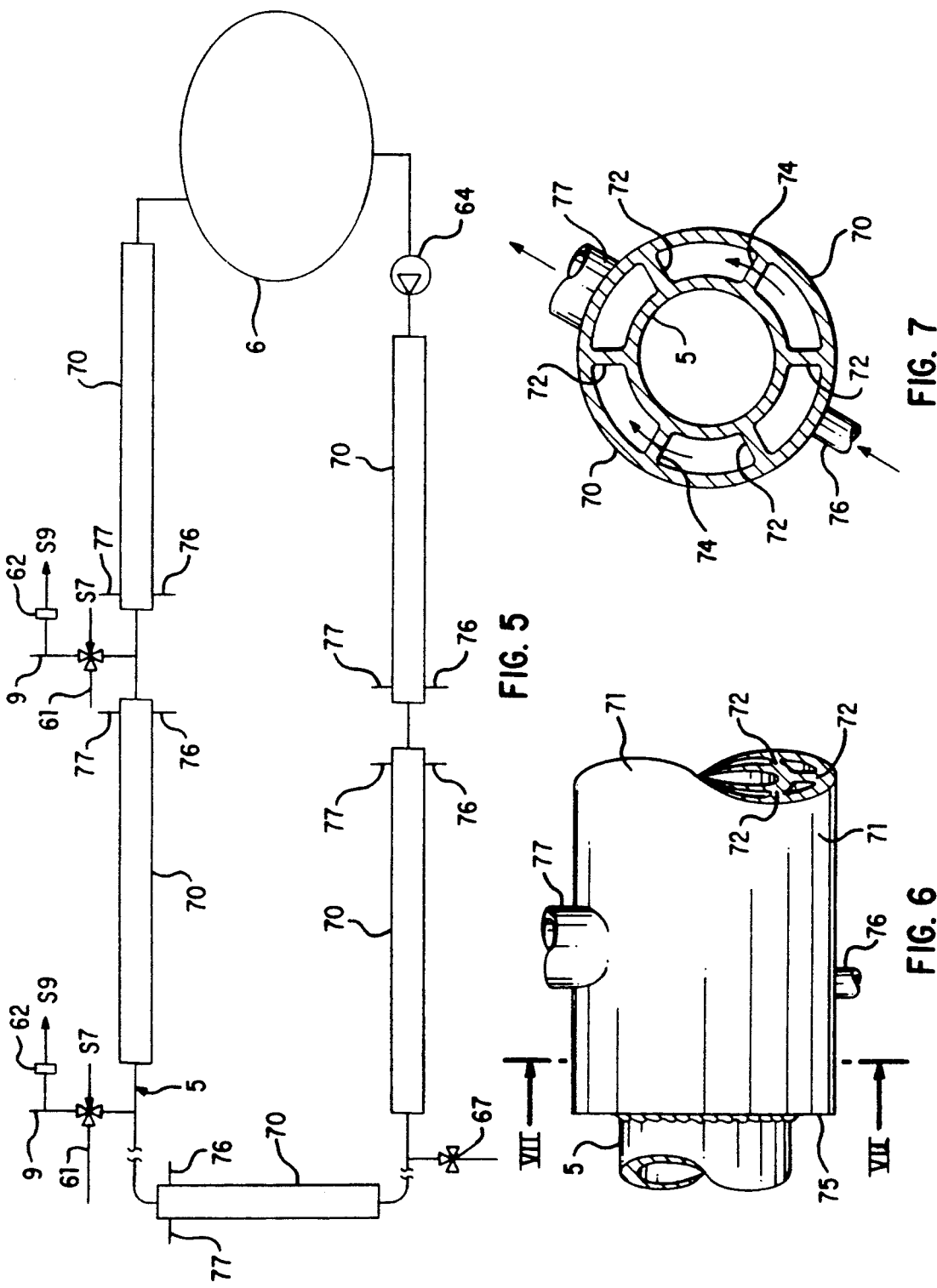

MILKING APPARATUS

RELATED APPLICATIONS

This is a continuation application Ser. No. 07/818,764, filed Jan. 13, 1992, now U.S. Pat. No. 5,195,456 which is a continuation-in-part of application Ser. No. 07/485,579, filed Feb. 27, 1990, which issued as U.S. Pat. No. 5,080,040, on Jan. 14, 1992.

BACKGROUND OF THE INVENTION

The present invention relates to a milking plant for milking cows, which plant comprises teat cups that are connectable to the respective teats of a cow's udder, the milk obtained from each udder quarter capable of being conveyed with the aid of the said teat cups, through a separate line to a milk measuring device for measurement and evaluation wherefrom, if from an unhealthy quarter it is separated, otherwise it is caused to flow through a common milk discharge line into a milk circulation loop, including a bulk milk tank, wherein the milk is cooled and continuously circulated to maintain it in wholesome condition for delivery to a dairy.

In prior art milking plants of the above-defined type, the teat cups are combined in one single milking claw, while the buffer space in the milking claw, to which space the teat cups are connected directly, comprises four separate chambers. Via four separate milk hoses the milking claw is connected to a milk meter, from which the milk can be separated or be supplied to a milk cooling tank. The object of the four-quarter milking claw is to provide better means to maintain the udder in a healthy condition; the milk originating from an inflamed quarter has a higher conductivity than that from a healthy one, which can be measured for each quarter, whereafter it can be determined whether or not the milk must be separated.

Such milking apparatus is less suitable when a common claw is used for all four teat cups from the cow's udder, and therefore it is preferable that the teat cups be interconnected to the milking system in general individually and independently of each other to the teats of the udder.

Moreover, having prevented unwholesome milk from being mixed with that from healthy quarters, it is important that the milk be maintained in its healthy state by being held continuously at the proper cool temperature (about 3° C. or 38° F.) and sufficiently circulated while periodically receiving warm milk from several milkings so that the milk's wholesomeness is maintained until its delivery to a dairy wherein it is further processed and placed in containers for retail sales.

SUMMARY OF THE INVENTION

The object of the invention herein disclosed is to provide a milking plant which is not only suitable for use when a single milking claw is used, but even more so wherein the test cups are interconnected into the system individually and independently of each other.

According to the invention, the milking plant of the above-defined type is characterized in that the milk measuring device includes four milk meters, the separate discharge lines of which are coupled to a common discharge line leading to a circulation loop that includes a bulk milk cooling tank and a pump for circulating the milk in the circulation loop while continuously cooling same. Due to the largely parallel structure of the milking system, an improved method of monitoring milk production is provided. The milk production can be effected from each udder quarter individually, while the teat cups can be removed independently of each other; consequently, the teats are not burdened unnecessarily.

In addition, according to the invention, a milk meter includes a milk receptacle and a measuring chamber, the milk being caused to flow by a vacuum produced in the milk receptacle into the measuring chamber, and then is caused to flow in defined quantities by means of compressed air from the measuring chamber into the relevant, separate discharge line. In particular, according to the invention, the air drawn along by the vacuum together with the milk from the relevant teat cup is separated therefrom in the milk meter. Consequently, milk containing air is received from the teat cup into the milk meter, whereas it is only the milk that is discharged therefrom to the milk circulation loop including the bulk milk cooling tank; in this respect it should be noted that it usually has been the custom to effect the milk-air separation not earlier than in the bulk milk cooling tank. In a specific embodiment in accordance with the invention, the milk meter is provided with a valve rod which, in a first position under a vacuum, leaves the aperture between the milk receptacle and the measuring chamber open, and, in a second position by means of compressed air, closes same. More specifically, in accordance with the invention there is provided a switching element, with the aid of which, in a first switching position thereof, vacuum is applied to cause the valve rod to be brought to its first position, and, in a second switching position thereof, compressed air is admitted to cause the valve rod to be brought to its second position. Furthermore, according to the invention, the measuring chamber is provided with a milk level sensor, which senses when a defined quantity of milk is contained therein and then produces a control signal to cause the switching element to be adjusted from its first position to its second position. Also, in accordance with the invention, the switching element may be adjusted from its second position to its first position after a fixed period of time. However, this might also be effected by means of a sensor which senses that all of the milk has been pumped from the measuring chamber, or by means of a flow sensor provided in the line beyond a teat cup. Furthermore, according to the invention, each time when a defined quantity of milk has been established in the measuring chamber, the milk level sensor may produce a control signal intended for a computer, in which the quantity of milk obtained from each udder quarter is recorded for each individual cow. In particular, the recording of this quantity and hence also that of the total quantity of milk obtained from each cow per unit of time, e.g., per day, may be kept on the basis of a progressive average calculated over a defined number of days.

According to the invention, the measuring chamber, when empty, is closed by a spherical body. Preferably, this spherical body is of such a design that, when the milk flows from the milk receptacle into the measuring chamber, it floats on the milk contained therein. Thus, each time the measuring chamber contains a predetermined quantity of milk, it is removed therefrom by means of the compressed air admitted into the chamber for that purpose. Furthermore, according to the invention, a non-return valve is included in the separate discharge pipe beyond the aperture in the measuring chamber, which aperture can be closed by the spherical body. Via this non-return valve the milk is passed from the measuring chamber, but only under the influence of compressed air. In the opposite direction, the non-return valve prevents reverse milk flow, which might be possible should the pressure in the relevant discharge pipes exceed that prevailing in the measuring chamber. This situation is conceivable because the milk is discharged from four milk meters to the circulation loop that includes the bulk milk cooling tank through the same common discharge line. The presence of the non-return valve beyond the measuring chamber aperture that is closable by the spherical body implies that, during the milking operation, the first obtained milk fills the separate discharge pipe between the said aperture and the non-return valve, as a result of which, according to the invention, each time a cow is milked, the measured quantity of milk recorded by a computer is numerically increased only once by the known quantity of milk corresponding to the volume of the separate discharge pipe between the measuring chamber aperture that is closable by the spherical body and the non-return valve.

In order to ensure the admission of compressed air via the measuring chamber into the discharge lines, in particular when these lines must be cleared of milk thereby e.g. in connection with a subsequent disinfecting, washing and rinsing procedure, in accordance with the invention, the milk meter is provided with a solenoid device which, by moving the spherical body, has for its object to establish a connection between the closed measuring chamber and the discharge lines.

According to the invention, each milk meter of the milk measuring device is provided with a milk conductivity sensor. More particularly, the milk conductivity sensor is arranged in the measuring chamber of a milk meter. The conductivity of the milk indicates the health of the udder quarter involved, the milk originating from an inflamed quarter having a higher conductivity than that from a healthy one. The milk originating from an inflamed quarter should not be mixed with the rest of the milk. According to the invention, a separate discharge line is provided with a three-way valve, through which the milk discharged from a relevant milk meter is either diverted into the common discharge line or, upon determining that the milk originates from an inflamed quarter, into a receptacle specially provided for the purpose. This three-way valve may be operated automatically as soon as a relevant milk conductivity sensor has measured a conductivity which exceeds a preset fixed value. In a preferred embodiment in accordance with the invention, however, the milk conductivity sensor applies a control signal to a computer, in which it is determined whether or not the relevant milk originates from an inflamed quarter, after which, when the former appears to be the case, the computer supplies a control signal to the three-way valve in the relevant separate discharge line so that the milk in question is diverted to the receptacle. The conductivity of the milk from the individual quarters can be compared with each other in the computer, whereby it is possible to establish from the spread in the conductivity values whether or not there may be a potential inflammation of one of the quarters. Older cows and cows in late lactation inherently have a higher milk conductivity than a younger and freshly calved ones. It is therefore not advisable to compare deviations in conductivity to a preset fixed value, but rather to compare the deviations relative to the cow's own standard, i.e., to compare the conductivity in the computer with a progressive average determined over a number of days for the relevant cow. The calculation of the progressive average may, of course, be combined with the aforementioned calculation of the spread.

According to the invention, a milk meter is provided with a tube stop valve, with the aid of which the vacuum connection of the milk meter can be closed after milking. The end of the milking procedure can be detected by means of sensors, e.g., with the aid of a milk flow sensor which may be incorporated in the line between the teat cup and the milk meter or in the milk meter itself, or with the aid of the aforementioned milk level sensor. In accordance with the invention, it is likewise possible to activate the tube stop valve after a milking period of a duration which is computer defined, e.g., on the basis of the number of times the measuring chamber has been emptied, has ended, i.e., by applying thereto a control signal provided by the computer. In a specific embodiment, the tube stop valve includes a lifting mechanism to allow air to flow into the milk meter simultaneously with or immediately after closure of the vacuum connection of the measuring chamber. This can be effected with a certain amount of overpressure; a simpler method is to operate the lifting mechanism, in accordance with the invention, by a valve in the outer wall of the milk meter. The tube stop valve in accordance with the invention renders it possible, in a simple manner, to remove the vacuum in a teat cup before the teat cup is removed from the teat or drops therefrom.

The milking plant is provided in customary manner with a vacuum pump having a vacuum balance tank to increase the vacuum stability. For larger plants in particular, preferably, the pump and the balance tank are arranged remote from each other and the balance tank is positioned close to the milking parlor. The balance tank has a plurality of vacuum connections: for each milk measuring device there are four connections for the vacuum connection of the individual milk meters, four connections for the valve rod control in each milk meter, and a connection for a electronic pulsator system for the four teat cups. A separate pulsator may be provided for each teat cup. The suction-rest ratio in the pulsator system may be adjustable, i.e., that for the rear quarters may be adjusted independently of that for the front quarters. According to the invention, the suction-rest ratio is established by a computer depending on the milk flow. When the milk flow decreases, it will be possible to provide a comparatively longer rest. This contributes to a reduction in the burdening of the teats, which is of the utmost importance when the animal is milked several times a day. According to the invention, a throttle ring is included in the vacuum connection from the balance tank to the milk meter. This ring prevents, should one of the teat cups fall from the teat, fluctuations from occurring in the prevailing vacuum and more particularly in the vacuum in the other teat cups. For the purpose of ascertaining whether or not a vacuum is present in a milk meter, in accordance with the invention, an air flow sensor is provided in the vacuum connection between the throttle ring and the milk meter.

In the situation wherein the four teat cups are incorporated in one single milking claw, the claw housing, whether or not divided into four compartments, constitutes a buffer space for the milk transport and for counteracting fluctuations in the vacuum under the teats to which the teat cups are connected. To obtain the same result in the situation wherein the teat cups are not incorporated in one single milking claw, but are connected to an associated milk meter which is in a relatively more remote position, in accordance with the invention, each teat cup is provided with such a buffer space at its lower end. In particular, this buffer space for the milk transport is in connection with the outer air via an air suction aperture. In connecting the teat cups, it is optionally possible, in order to facilitate this connection, to employ an increased vacuum, although in that case more air is drawn into the teat cup.

It must be possible for the milk line system to be thoroughly cleansed and rinsed after milking. In accordance with the invention, for this purpose there is included in the common discharge line a three-way valve, through which in a first position thereof the milk is passed via the common discharge line to the milk cooling tank, whereas in its second position the three-way valve establishes a wash/rinse line system. In particular, the wash/rinse line system includes a rinse jetter which, with the object of flushing the lines, is connected to a teat cup, while a washing and/or rinsing fluid is passed by the vacuum in a milk meter from a washing and/or rinsing fluid container through a first rinsing line to the wash/rinse jetter and from there, via a teat cup, into the relevant milk meter, whereafter the washing and/or rinsing fluid is returned through the relevant separate discharge line, the common discharge line, the three-way valve incorporated therein, and a second washing and/or rinsing line to the washing and/or rinsing fluid container. Prior to washing and/or rinsing operations, all the milk must first have been forced from the lines to be washed and/or rinsed, in particular all the milk present in the common discharge line must have been forced through the three-way valve incorporated therein. To determine that this has indeed occurred, according to the invention, an air-milk sensor is provided in the common discharge line in front of the three-way valve incorporated therein.

Furthermore, in accordance with the invention, a heat exchanger may be provided in the common discharge line forward of the three-way valve incorporated therein as a pre-cooling device for the bulk milk cooling tank.

Also, in accordance with the invention, the bulk milk cooling tank is included in the circulation line, to which the common discharge lines of the individual milk meters are connected. More generally, therefore, the invention relates to a milk measuring system for milking cows, which system comprises a milk cooling tank, characterized in that this milk cooling tank is included in a circulation line or loop, the common discharge lines of the individual milk meters being connected to the said circulation line. For the purpose of preventing, after milking, that residual milk remains in the circulation line, in accordance with the invention, the circulation line is provided with a pump to pump the milk from the bulk milk cooling tank therethrough. Preferably, the circulation line or loop is thermally insulated and includes means for cooling the milk flowing therethrough whereby the provision of cooling coils or plates for the bulk milk cooling tank can be reduced or entirely eliminated. With the milk being circulated from and through the bulk milk cooling tank, milk inside the tank is kept in motion and it is no longer necessary to provide other means such as a stirrer, for accomplishing the same function.

In a preferred embodiment in accordance with the invention, the bulk milk cooling tank is provided with a washing and/or rinsing fluid supply line, through which, after all the milk has been removed from the bulk milk cooling tank, a washing and/or rinsing fluid is introduced into the bulk milk cooling tank, which washing and/or rinsing fluid is circulated through the circulation line by means of the pump. In particular, the pump has the capacity to operate at at least two speeds, that is, the pump may have two or more operating speeds, or may be a variable speed pump. Milk therein is circulated at a relatively low speed whereas the washing and/or rinsing fluid is circulated at a relatively high speed. Furthermore, in accordance with the invention, a three-way valve is incorporated in the circulation line, by means of which the circulating washing and/or rinsing fluid can be discharged. To wash and/or rinse the bulk milk cooling tank in a most advantageous manner, in accordance with the invention, it includes a sprayer connected to the washing and/or rinsing fluid supply line; by mounting this sprayer to be movable, so that the entire inner surface of the bulk milk cooling tank can be sprayed and cleaned, an extremely efficient cleansing and rinsing system is provided.

For a better understanding of the invention and to show how the same may be carried into effect, reference will now be made, by way of example, to the accompanying drawings, in which:

BRIEF DESCRIPTION OF THE DRAWINGS

FIG. 3 is a more detailed representation of the basic structure of a milk meter in the arrangement shown in FIG. 2;

FIG. 4 is a more detailed representation of the basic structure of a teat cup in the arrangement shown in FIG. 2;

FIG. 5 is a schematic representation of a cooling loop used for cooling milk entering and which is circulated through the bulk milk tank as part of the loop;

FIG. 6 is a fragmentary view of an evaporator structure for the cooling loop conduits; and FIG. 7 is a sectional view taken on lines VII—VII of FIG. 6.

DESCRIPTION OF THE PREFERRED EMBODIMENTS

Figure 1:
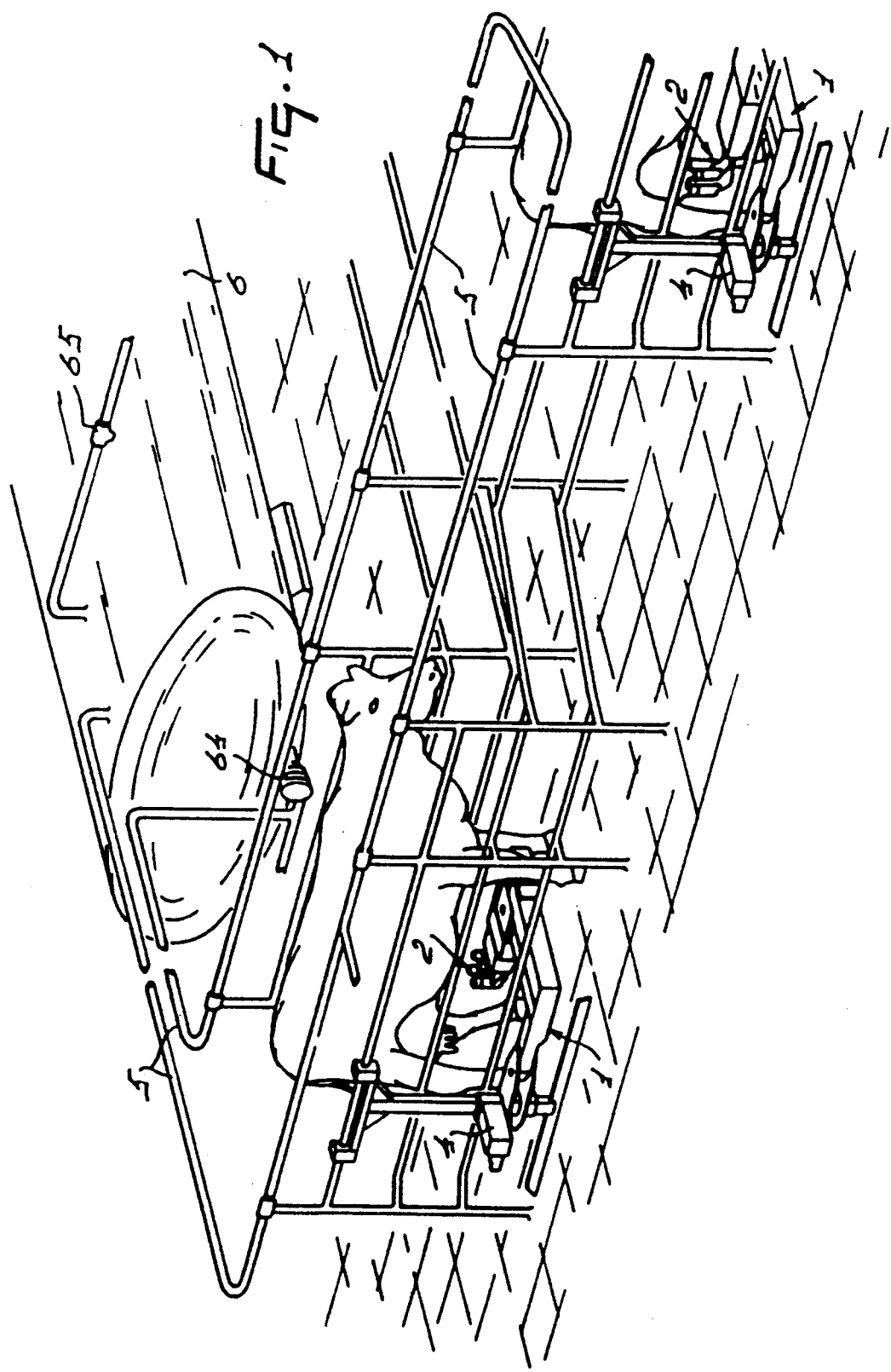
FIG. 1 shows schematically an arrangement of a milking plant for milking cows.

FIG. 1 shows a schematic arrangement of a milking plant for milking cows, wherein only two milking stations are shown by way of illustration, a cow being present in each. Corresponding components in the drawings have been denoted by the same reference numerals. For each milking station, a milking robot 1 designated generally by reference number is provided which includes at one end a set of four teat cups 2. The invention, as such, is generally independent of the manner in which the teat cups are connected; the teat cups may, combined in one single milking claw, be connected together as well as individually and independently of each other to respective teats of a cow's udder. The milk obtained from each udder quarter with the aid of teat cups 2 can be conveyed through a separate line 3 (FIGS. 2, 3 and 4) to a milk measuring device 4. Milk measuring devices 4 of the various milking stations are interconnected to a milk recirculation line or loop 5 that includes a bulk milk cooling tank 6.

Figure 2:
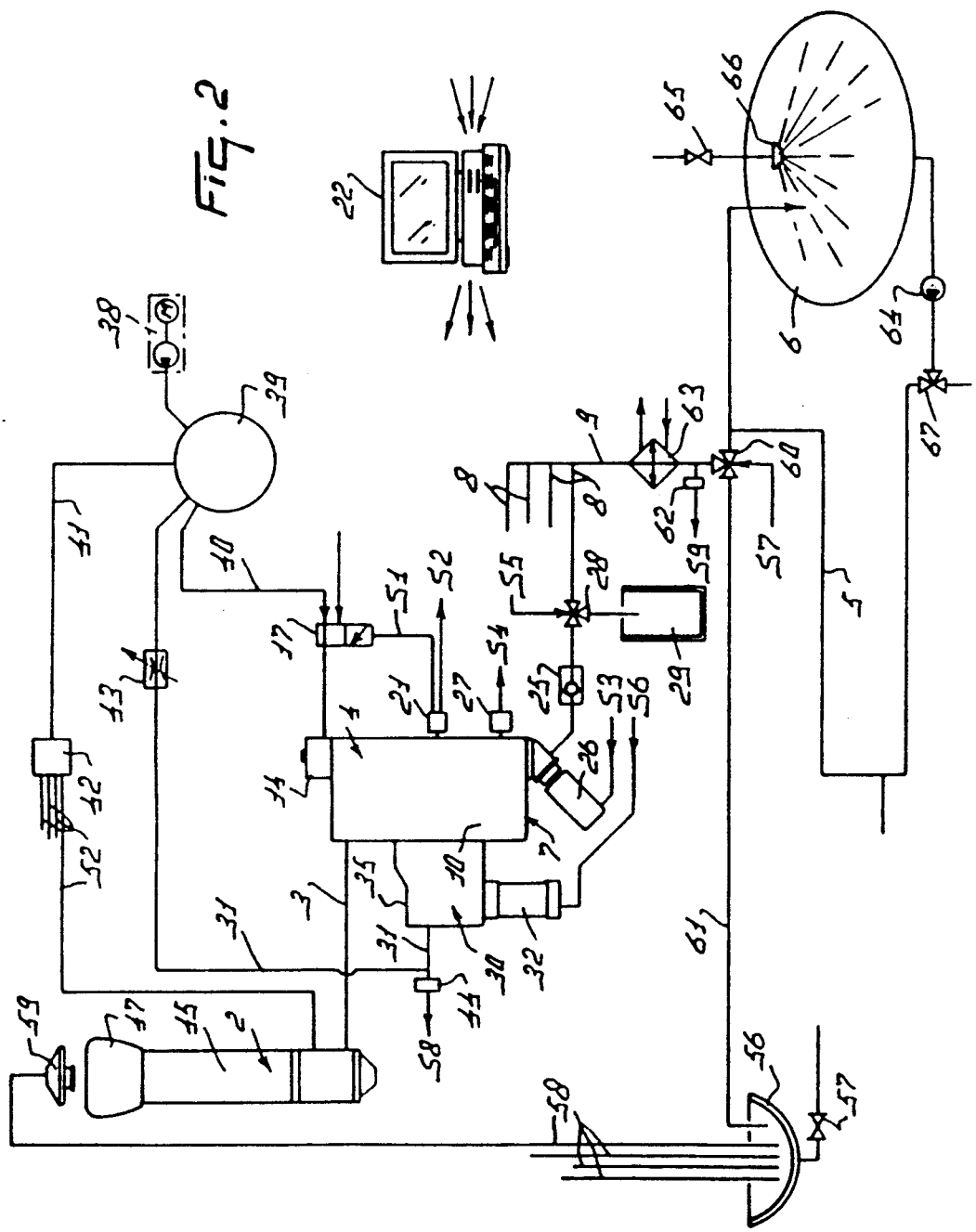
FIG. 2 diagrammatically shows a basic arrangement of the milking plant in accordance with the invention.

Milk measuring device 4 comprises four milk meters 7, only one of which is shown in FIG. 2. FIG. 2 furthermore illustrates the basic arrangement of the milking plant, only one teat cup 2 and only one milk meter 7 being shown, however, in this arrangement for the sake of simplicity. The individual discharge lines 8 of milk meters 7 of each milking station are coupled to a common discharge line 9 which leads to the recirculation line 5 and, via line 5, to bulk milk cooling tank 6, which is included as part of the loop comprising line 5. FIG. 3 is a more detailed representation of the structure of milk meter 7 incorporated in the milking plant shown in FIG. 2. It will thus be seen that milk meter 7 includes a milk receptacle 10 and a measuring chamber 11, in which connection the milk flows under a vacuum produced in milk receptacle 10 through separate line 3 connected to teat cup 2 into measuring chamber 11 and is pumped in defined quantities by means of compressed air from the measuring chamber 11 into separate discharge line 8. Milk meter 7 includes a valve rod 12 which, in a first (shown) position under a vacuum, causes an aperture 13 between the milk receptacle 10 and the measuring chamber 11 to be in an opened condition, and, in a second (not shown) position by means of compressed air, closes aperture 13. At its upper side, the milk meter includes a chamber 14, in which chamber valve rod 12 comprises a piston 15. Valve rod 12 is capable of upward and downward movement in and through this chamber 14. In the space below the piston 15 there is provided in the wall of the chamber 14 an aperture 16. Via such aperture 16, milk meter 7 is connected to a switching element 17 (see FIG. 2). In a first position of switching element 17, a vacuum is applied to cause the valve rod 12 and the piston 15 to be moved downwardly to its opened first position. In a second position of switching element 17, compressed air is admitted into the space below the piston 15 to cause the valve rod 12 and therefore the piston 15 to be moved upwardly to its closed second position, thereby closing the aperture 13. Milk meter 7 furthermore includes a tube 18 which, via relatively narrow apertures 19 and 20, is connected to the space in the chamber 14 below the piston and to measuring chamber 11 via aperture 19, tube 18 and aperture 20, as a result of which the milk present in the measuring chamber 11 is passed into the separate discharge line 8.

Measuring chamber 11 is provided with a milk level sensor 21, by means of which it is determined when a defined quantity of milk is contained therein. When the milk level in measuring chamber 11 reaches that of the sensor 21, sensor 21 provides a control signal S1 (see FIG. 2) to cause switching element 17 to be adjusted from its first position to its second position, so that measuring chamber 11 is emptied. After a fixed period of time, switching element 17 is adjusted from its second position to its first position; this period of time is of such duration that there is sufficient time for measuring chamber 11 to be emptied. When the switching element 17 has returned to its first position, the measuring chamber 11 is filled again. Milk level sensor 21 also has the capacity for providing a control signal S2 to a computer 22, in which the quantity of milk obtained from each udder quarter is recorded for each individual cow.

In the lower part of measuring chamber 11, a spherical body 23 is provided. When measuring chamber 11 is empty, this spherical body 23 closes an aperture 24 between measuring chamber 11 and separate discharge line 8. Spherical body 23 is composed of a material of low specific gravity or is constructed to be hollow so that, when milk flows from milk receptacle 10 into the measuring chamber 11, body 23 floats on the milk contained therein. When the milk is forced from the measuring chamber 11 into separate discharge line 8, aperture 24 is closed automatically by spherical body 23 once measuring chamber 11 is empty. A non-return valve 25 (FIG. 2) is arranged in separate discharge line 8 downstream from aperture 24 that is located in measuring chamber 7, preferably as closely as possible therebeyond. Via this non-return valve 25, the milk is allowed to pass from measuring chamber 11, but only when under the influence of compressed air. In the opposite direction, non-return valve 25 blocks any milk flow which might be possible if, for whatever reason, the pressure in the relevant discharge lines should exceed that prevailing in measuring chamber 11 in front of non-return valve 25. When, during the milking operation, the first obtained milk flows into measuring chamber 11, then not only is measuring chamber 11 itself filled, but also the space in the separate discharge line 8 between the non-return valve 25 and said aperture 24 is filled. By each subsequent pump stroke, however, only that milk contained in the measuring chamber is drawn off, so that the total quantity of milk as determined by the computer during milking for each udder quarter must be increased initially once by the quantity of milk that corresponds to the volume of separate discharge line 8 between non-return valve 25 and said aperture 24. This is, however, a constant correction to be entered into the computer 22 on recording of the quantity of milk obtained. After milking, the milk must also be removed from separate discharge lines 8 and common discharge line 9, whereupon it is received in circulation line 5 and bulk milk tank 6. For that purpose, aperture 24 in measuring chamber 11 should be opened to allow compressed air in chamber 11 to flow therefrom. To that end, milk meter 7 is fitted with a solenoid device 26 which moves spherical body 23 upwardly in response to a control signal S3 from computer 22.

Milk meter 7 includes a milk conductivity sensor 27, which sensor is preferably arranged in measuring chamber 11. A control signal S4 from milk conductivity sensor 27 provides a measure of the udder's condition of health; in the case of mastitis, the electrical conductivity of the milk is higher than that of milk obtained from a healthy udder or from a healthy udder quarter. The milk originating from an inflamed udder quarter must be segregated from the milk from healthy udder quarters. For this purpose, separate discharge line 8 is provided with a three-way valve 28 (FIG. 2), through which the milk pumped from the milk meter 7 is either passed into the common discharge line 9 or, after it has been found that the milk originates from an inflamed quarter, into a receptacle 29 specially provided for the purpose. Three-way valve 28 might be operated automatically as soon as signal S4 produced by the milk conductivity sensor 27 indicates a value which exceeds a preset value. It is, however, more advantageous to apply the control signal S4 computer 22 which, taking account of the further conditions of the specific cow, generates a control signal S5, by means of which the three-way valve 28 can be operated.

In addition, milk meter 7 is provided with a tube stop valve 30, with the aid of which the vacuum connection 31 can be disconnected from the milk meter after milking. During milking, a vacuum prevails in the milk receptacle 10. After the milking procedure has ended, the vacuum must be removed, and it is not until then that the teat cups are removed from the teats. Prior to removing the vacuum from milk receptacle 10, vacuum line 31 must first be closed. For that purpose, after a milking period preset in the computer 22 has elapsed, a control signal S6 is applied to the electromagnet 32 of tube stop valve 30. By means of the then energized electromagnet 32, a rod 33 having a spherical end 34 is moved upwardly to seal the vacuum connection 31 against the fixed stop 35. With the aid of a lifting mechanism 36 which is connected pivotably to the rod 33, a valve 37 in the wall of the milk receptacle 10 is drawn upwards simultaneously, as a result of which air can flow freely thereinto.

The milking plant as shown schematically in FIG. 2 includes in a customary manner a vacuum pump 38 having a vacuum balance tank 39 to increase the vacuum stability. Balance tank 39 has a plurality of vacuum connections. A vacuum connection 31 is provided for milk receptacle 10 of each milk meter 7. A vacuum connection 40 is present for each switching element 17. In addition, a vacuum connection 41 is provided for an electronic pulsator system 42 for the four teat cups. A throttle ring 43 is provided in vacuum connection 31 to prevent vacuum fluctuations in the various milk meters because one of the teat cups is dislodged or otherwise removed from its corresponding teat. To ascertain whether or not a vacuum is present in the milk meter, an air flow sensor 44 is arranged in the vacuum connection between throttle ring 43 and the relevant milk meter, which sensor supplies computer 22 with a control signal S8 indicating the presence of vacuum in the line 31. Hereby this signal also provides an indication whether the teat cups are connected correctly.

FIG. 4 shows a longitudinal cross-sectional view of a teat cup 2; this teat cup in a customary manner has a solid, e.g., metal, sleeve 45, an inner wall 46 made of a flexible material, e.g., rubber, enclosed thereby, and a rubber cap 47 which seals the space between sleeve 45 and inner wall 46 at the upper side. At the lower side, the space between sleeve 45 and inner wall 46 is sealed by a sealing ring 48, while at some distance thereabove there is provided between the sleeve 45 and the inner wall 46 a ring 49 having an aperture 50. Between sealing ring 48 and ring 49 there is located a space, in which the electronic pulsator system 42 produced through the line 52 and via an aperture 51 a pulsating vacuum, thereby effecting in the space between sleeve 45 an inner wall 46 sufficient pressure to close the inner wall firmly around the teat, when the teat cup is connected thereto, or sufficient vacuum to cause the inner wall to move outward again, whereby a rhythmic movement is provided around the teat as required for the milking operation to be performed. To function as a buffer for the milk to be collected and to minimize the fluctuations in the vacuum under the teat, there is provided in the lower part of teat cup 2 a buffer space 53, in which a relatively narrow bleeder opening or air suction aperture 54 is made for the milk transport. Line 3, intended for the discharge of the milk to milk meter 7, is connected to this buffer space 53. In addition, buffer space 53 contains a fixed element 55, which element partly projects into the aperture between the teat space and the buffer space 53 to ensure that milk flows gradually into the buffer space 53 and a splitting of the milk is prevented. At the upper end of the fixed element 55 a sensor can be provided to measure temperature. The temperature of the milk indicates the body temperature of the cows being milked; such temperature being above normal for cows in heat and sick cows.

When the milking operation has been completed, an arrangement is provided for cleaning and rinsing the milk line system. To such end, a rinse line system is provided constituted by a rinse fluid container 56 having a valve 57, a first rinse line 58, a rinse jetter 59 which can be fitted around the end of the teat cup 2 in a fluid-tight manner, teat cup 2, line 3, milk meter 7, separate discharge line 8, common discharge line 9, a three-way valve 60 incorporated therein and a second rinse line 61. In its first position, three-way valve 60 admits milk from the common discharge line 9 into circular line 5, and, in its second position, cleansing and/or rinse fluid from common line 9 flows into the second rinse line 61. Valve 60 also, of course, includes a closed position to prevent fluid flow either to rinse line 61 or to tank 6. After the milking, a washing and/or rinse command can be delivered by computer 22 which, to that end, applies a control signal S7 to three-way valve 60 to adjust same to the appropriate position. Prior to starting the cleansing and rinsing steps after the milking operation has ended, the discharge lines must first be freed from milk. This is effected by passing compressed air through each measuring chamber 11, as a result of which the spherical body 23 therein is pushed upwardly and the aperture 24 is opened. Forward of the three-way valve 60, incorporated in common discharge line 9, is an air-milk sensor 62, which sensor sends a control signal S9 to the computer, on the basis of which control signal the computer can establish when there is no longer any milk present in the common line—compressed air then being sensed by the air-milk sensor 62 instead of milk—so that the valve 60 can be adjusted to prevent the flow of the compressed air therethrough into the bulk milk cooling tank 6 and to be ready for initiating the washing and rinsing procedure. Due to the vacuum in the milk receptacle 10, cleansing and/or rinse fluid is drawn from the rinse fluid container 56 through first rinse line 58, rinse jetter 59, teat cup 2 and line 3 to milk receptacle 10, from where it flows into measuring chamber 11. Thereafter it is pumped from chamber 11 in the same manner as the milk and is fed back via the separate discharge line 8, the common discharge line 9, the three-way valve 60 and the second rinse line 61 to the rinse fluid container 56.

In common discharge line 9 there is arranged before three-way valve 60, which is incorporated therein, a heat exchanger 63 as a pre-cooler for the milk cooling tank.

Bulk milk cooling tank 6 is included in the loop comprising circulation line 5, to which, via relevant three-way valves 60, common discharge lines 9, of individual milk meters 7 are connected. A pump 64 is also incorporated in circulation line 5. Pump 64 is capable of operating at at least two different speeds. To keep the milk in motion and to prevent milk residues from being deposited in the circular line 5, the milk is circulated at a relatively low speed from bulk milk cooling tank 6 through circulation line 5. Preferably, in this connection, circulation line 5 is thermally insulated. Usually, bulk milk cooling tank 6 is emptied several times a week, whereafter it is washed and/or rinsed. A cleansing and/or rinsing fluid is introduced into that tank 6 via a valve 65 and a spray nozzle 66. When spray nozzle 66 is arranged so as to be capable of moving, it jet cleans and rinses the entire inner surface tank 6. The cleansing and/or rinsing fluid is circulated by the pump in the circulation line at a relatively high speed and is ultimately discharged via a three-way valve 67. Also here, valves 65, 67, spray nozzle 66, and pump 64 can be controlled from the computer 22.

Although in FIG. 2 they are shown as being single, the several elements are provided fourfold for each milking device; in particular this holds for the rinse jetters, the teat cups and the milk meters, as well as for the lines connected thereto and the elements incorporated therein (valves and sensors). Preferably, however, the four milk meters are combined into a single and integral milk measuring device.

A further embodiment of the invention is disclosed with reference to FIGS. 5, 6 and 7 for utilizing the loop or circulation line 5 for cooling the milk which enters into the bulk milk tank 6 and for continuously cooling the milk previously received in tank 6. Automatic milking, the bulk milk tank system and automatic cleaning of the milking apparatus have been revolutionary advances in the dairy farm art. Cows are now conventionally milked twice a day with the milk leaving the cows' teats at approximately 90° F., whereupon it is conveyed through stainless steel conduits to the stainless steel bulk milk tank. Conventionally, the milk may be cooled by precoolers before it is received by the bulk cooling milk tank as disclosed in the first embodiment and, in any event, the bulk cooling milk tank includes in its sides plates or coils for evaporative cooling. The tanks are also well insulated to ensure that the milk stored therein will be maintained at the proper temperature, usually about 38° F. Because milk leaving the cow's teats is much warmer, usually on the order of about 90° F., milk precoolers are frequently utilized and improve the efficiency of the system. Depending upon the type of precooler used, cleaning and rinsing can sometimes be a serious problem which must be accomplished largely manually to ensure thorough cleaning as well as to be able to inspect all parts of the precooler to which the milk may be exposed. Bulk cooling milk tanks are produced in a variety of different sizes depending upon the volume of milk which is produced by the dairy farm's herd wherein they are installed. Two or more tanks may be used at a single installation although, for economy reasons, most installations will have only one tank. At most installations, the temperature of the milk within the bulk milk tank is continuously monitored to ensure that it does not rise above a certain temperature, which is usually about 50° F. It is also necessary that the milk be stirred to ensure that the temperature of the milk within the bulk milk tank is uniform throughout. The present invention of the instant embodiment provides not only for the precooling of the milk as it proceeds from the milking apparatus into the bulk milk tank, but also the invention provides for the continuous cooling of the milk in the bulk milk tank and maintaining a uniform temperature thereof without the need of a stirrer. Moreover, in many cases the necessity of providing evaporative coils in the bulk milk tank is eliminated inasmuch as the circulation of the milk through the refrigerated circulation loop may sufficiently cool the milk to maintain it at a temperature which is sufficiently low that the milk can be stored for a lengthy period of time without serious or significant deterioration of its quality.

The concept of precooling the milk via the piping between the individual milking units and the bulk milk tank is known as exemplified by U.S. Pat. No. 4,013,043, of Mar. 22, 1977, to Kirwan. However, this system utilizes water jackets which are applied over the milk conduits for the major portion of their lengths, whereby the cooling is accomplished by cold water. But water cooling is not necessarily overly efficient because it does not involve a phase change as occurs with normal refrigeration. Phase changes in the condensers and evaporators of conventional refrigeration units take advantage of the latent heat which is released from the refrigerants during the condensation and evaporation phase changes. Accordingly, considerable improvement in the heat transfer from refrigerants confined within jackets surrounding the milk conduits can be obtained through the use of conventional refrigerants within the jacketed spaces surrounding the conduits that perform the evaporative function of a conventional refrigeration apparatus. Through the utilization of such jackets on the loop comprising circulation line 5, one obtains not only the advantages of precooling the milk before it is received in the bulk milk tank 6, but also of continuously cooling the milk by circulating same around the loop between and even during the milking operations when milk is contained in the bulk milk tank 6. This also "stirs" the milk to maintain the milk generrally homogeneous in character both from the standpoint of temperature and also in precluding separation of the various milk constituents. This system further permits a reduction or even elimination of the evaporator coils which are conventionally installed in bulk milk tanks.

As mentioned above, the jacketing the conduits between the automatic milking devices and the bulk milk tank wherein cold water is utilized as a cooling medium is not unknown and is disclosed, for example, in U.S. Pat. No. 4,013,043, of P. Kirwan, of Mar. 22, 1977. Further, U.S. Pat. No. Re. 23,544, of Duncan of Sep. 2, 1952, discloses the use of an evaporator in a cylindrical unit surrounding a milk line or hose leading to a milk can. Accordingly, the concept of cooling milk while flowing in the conduit from the milking device to a milk storage container from whence it is delivered to the dairy is, at least in a broad sense, known in the prior art. An object of the embodiment shown in FIGS. 5-7 is to provide in a milking plant, a recirculation line which receives the common discharge lines of the individual milk meters and wherein the milk delivered to the bulk milk cooling tank is precooled and thereafter circulated and simultaneously cooled to maintain the milk in a homogeneous state and at low temperature for several milkings, whereby the milk will be of an excellent quality and purity upon being transferred to the milk transport tank truck and received at the dairy. Further, inasmuch as refrigeration apparatus can readily incorporate and, in fact, constitute a heat pump, the same milk conduit lines which were cooled during the milking operations and while the milk was being circulated therein can next, for the purpose of washing, disinfecting, and rinsing those conduits, be heated to maximize the sanitizing effects of this operation.

Referring now to FIGS. 5-7, reference numeral 5 designates generally the loop comprising the circular line or conduit which receives the common discharge lines 9 leading from the four discharge lines 8 that receive milk from individual teat cups 2 and milk meter 7 as previously described. Between the receipt of each discharge line 9 and the bulk milk cooling tank 6, and also throughout the loop 5, there are surrounding the conduit of loop 5, a plurality of evaporator/condensers 70 which serve to cool milk flowing in conduit loop 5 during the milking operation and between milking operations while milk from prior milking operations is stored within the bulk milk cooling tank 6. Evaporator/condensers 70 can also be used to heat disinfectant, washing and rinsing fluids which are passed therethrough during the cleansing portion of the operation which is initiated after the bulk milk cooling tank 6 has discharged its contents to the milk transport tank truck, which generally occurs every other day or at intervals of not more than two or three days. Where a milking parlor, as such, is involved, normally there will only be two common discharge lines 9 from two milking stations which are received in the circular loop 5. However, with a stanchion barn operation, it will be understood that a large number of such common discharge lines will be involved. The evaporators/condensers 70 each comprise a jacket member 71. Jacket member 71 is constructed to have six inwardly extending fins or dividers 72 and 74 which are integral with, or in any event provided with an efficient thermal connection with, conduit 5. A ring member 75 is welded to close each end of jacket members 71 in a manner wherein it is welded both to conduit 5 and to each jacket member 71. Two of the divider members 74 are inset at one end away from ring member 75, but are flush therewith at the other end. The other four dividers members 72 are flush with ring member 75 at the end shown in FIG. 6 and inset therefrom at the opposite end from the corresponding opposite ring member 75. Each jacket member 71 has an inlet connection 76 and an outltet phase, outlet 77 for the evaporation phase. In the condensing phase, outlet 77 then becomes inlet whereas inlet 76 functions at an outlet. In either case, an elongated sinuous pathway is defined by the dividers 72 and 74. Thus, in the evaporation phase, refrigerant, as a liquid, first enters through inlet 76, travels horizontally through a space defined by the two lower dividers 72, to the end of the jacket member 71, wherein it turns around the inset portions of the lower dividers 72 and enters into the further horizontal spaces defined by the lower dividers 72 and the dividers 74. The refrigerant again, as it is evaporated by the warm milk flowing through conduit 5, undergoes a phase change from a liquid into a gas, and flows around the inset ends of dividers 74, again through the horizontal passageways defined by the intermediate dividers 74 and the upper dividers 72, whereupon at the end thereof it reverses course and is drawn out through the space defined by upper dividers 72 into the outlet 74. In the condenser phase, a hot gas enters in the now inlet 77 to follow then a reverse fluid flow, wherein it is condensed and its latent heat of condensation is transferred to the liquids used for disinfection, washing, and rinsing now flowing through conduit 5. Pump 74 is, as previously described, kept at a relatively slow speed for circulating milk through the loop 5, is now operated at a higher speed for the disinfecting, washing and rinsing operations. Although not shown, it will be appreciated that the evaporator/condenser 70 as well as the conduit 5 are normally insulated to minimize any significant losses or gains of thermal energy from the ambient air.

Although we have disclosed our preferred embodiments of the invention, it should be understood that it is capable of other adaptations and modifications within the scope of the appended claims. For example, various types of refrigerant and heat pump apparatus may be utilized with the invention, including not only those which use conventional fluorocarbon refrigerants, but also other refrigerants which are compatible with the metal or metals or other materials of which the evaporator/condensers are constructed. These include water and water based mixtures which can be utilized as a refrigerants at low absolute pressures and are quite advantageous because of water's high specific heats that permit a considerable transfer of thermal energy during its evaporation and condensation. Water and appropriate water based mixtures are also highly desirable because of their lack of toxicity or potential to cause environmental harm. To ensure that flow from the common discharge lines 9 is not impeded by circulation in loop 5, their connections with loop 5 may use well known structures which take advantage of the Bernoulli effect, that is the phenomenon of internal pressure reduction with increased stream velocity in the fluid so, in effect, milk is drawn from line 9 into conduit 5. To ensure drainage, the conduit 5 may be supported in a manner wherein it is at a minor deviation from horizonal, say, 3°–7°. To the extent that suitable materials permit same, evaporators/condensers 70 may constitute in large part extrusions to the extent possible. In addition, it is contemplated that the computer control will be utilized to the maximum extent practical and feasible to provide the necessary automatic control to maintain operations of the milking plant disclosed herein at their most advantageous effectiveness and efficiency to ensure that the operation produces and delivers to the dairy only the highest quality product. Although indicated herein that the pump 64 is a two speed pump, a slower speed for the recirculation and cooling operations and a higher speed for the disinfecting, washing and rinsing operations, it will be appreciated that pump 64 may also be a variable speed pump which is advantageous in some instances during the milking operation to control the mixing ratios of the already cooled milk with the much warmer milk received directly from the dairy cows so that the milk within the bulk milk cooling tank 6 is at all relevant times maintained at a desirably low temperature.

Having disclosed our invention, what we claim as new and desire to secure by Letters Patent of the United States is:

1. A milking tank for milking cows comprising a plurality of automatic milkers, a milk discharge line from each of said milkers, a milk conduit line loop into which each of said milk discharge lines is interconnected to deliver milk thereto from the corresponding said automatic milker, a milk conductivity sensor and a valve controlled by said milk conductivity sensor disposed in each said milk discharge line between each of said automatic milkers and said milk conduit line loop, a receptacle for receiving milk unsuitable for human consumption interconnected by a fluid conduit to said valve, said milk conduit sensor including means for causing said valve to divert milk unsuitable for human consumption as sensed by said milk conductivity sensor from said discharge line to said receptacle.

2. A milking plant in accordance with claim 1, wherein said milk conduit line loop comprises a bulk milk tank and a milk pump, said milk pump having at least two speeds comprising a slower speed for continuously circulating said milk in said loop and a faster speed for circulating cleansing and rinsing fluids through said loop, including said bulk milk tank, for washing and rinsing the interiors of the conduits that comprise said loop and said bulk milk tank therein after said milk has been discharged from said bulk milk tank for delivery to a dairy.

3. A milking plant for milking cows that comprises a plurality of automatic milkers, each said automatic milker having four teat cups, said teat cups each having a separate line for conveying milk therefrom, a bulk milk tank, means for circulating milk into and out of said bulk milk tank, discharge lines from said separate lines of said plurality of automatic milkers interconnected into said milk circulation means, a milk circulation loop that includes said milk circulation means, said bulk milk tank being included in said milk circulation loop in an arrangement wherein milk can be continuously circulated around said milk circulation loop including through said bulk milk tank and said milk circulation means, a pump in said milk circulation loop for circulating milk through said circulation loop, a plurality of chambers, one of each of said chambers arranged between each separate line and each said discharge line so that milk from each said teat cup passes into a corresponding said chamber via a corresponding said separate line and from such chamber into a corresponding discharge line, a milk conductivity sensor in each said chamber and a corresponding diversion valve controlled by said sensor in each said discharge line, receptacle means for receiving milk diverted thereto by a said diversion valve from a corresponding said discharge line in response to control thereof by a corresponding said sensor when the conductivity of said milk in the corresponding said chamber indicates that the milk received therein is unsuitable for human consumption.

4. A milking plant for milking cows comprising four teat cups, said teat cups being connectable to the respective teats of a cow's udder, a bulk milk cooling tank, conduit means between said teat cups and said bulk milk cooling tank for conveying milk received from each udder quarter via said teat cups to said bulk milk cooling tank, diversion means associated with said conduit means for diverting therefrom milk unsuitable for human consumption, receptacle means for collecting and storing said milk diverted by said diversion means because it is unsuitable for human consumption, and further conduit means interconnecting said diversion means with said receptacle means for conveying milk diverted by said diversion means to said receptacle means.

5. A milking plant in accordance with claim 4, wherein said diversion means comprises a valve through which milk which flows therethrough is selectively either conveyed to said bulk milk cooling tank or diverted to said receptacle means.

6. A milking plant in accordance with claim 5, comprising a computer and a milk sensor means operatively associated with said computer receiving a milk sensing signal from milk in said conduit means and transmitting information to said computer whether or not said milk is unsuitable for human consumption, said computer further transmitting a control signal to control means associated with said valve that controls said valve selectively to effect the diversion of said milk to said receptacle means or to permit wholesome milk to be conveyed to said bulk milk cooling tank.

7. A milking plant in accordance with claim 6, wherein said milk sensor means comprises a milk conductivity sensor and transmits information of the conductivity of the milk as sensed by said conductivity sensor means to said computer, said control signal to said, control means being determined by the relative conductivity of the milk as sensed by said milk conductivity sensor, said control means controlling said valve based on such sensed relative conductivity to permit wholesome milk to be conveyed to said bulk milk cooling tank or to divert the milk unsuitable for human consumption to said receptacle means.

8. A milking plant in accordance with claim 7, wherein when said milk sensor means transmits a signal to said computer that said conductivity of the milk sensed is relatively high, said computer transmits said control signal to said control means which automatically causes said valve to divert the milk to said receptacle means.

9. A milking plant in accordance with claim 8, wherein said control signal representing the conductivity of the milk being sensed is compared in said computer with a progressive average of the milk's conductivity values measured over a plurality of days for the farm animal being milked and if the milk's conductivity exceeds said progressive average value by a predetermined amount, said control means is caused automatically to effect the diversion of the milk by said valve to said receptacle means.

10. A milking plant in accordance with claim 4, wherein said diversion means comprises at least one diversion valve, and which plant comprises a milk measuring device in said conduit means between said udder quarters and said bulk milk cooling tank, said valve being in said conduit means between said milk measuring device and said bulk milk cooling tank.

11. A milking plant is accordance with claim 10, wherein said milk measuring device comprises four milk meters, each of said milk meters being associated with a respective teat cup and being provided with a milk conductivity sensor.

12. A milking plant in accordance with claim 11, wherein said conduit means comprises an individual discharge line from each of said milk meters and a common discharge line into which each of said individual discharge lines is connected, each of said individual discharge lines being provided with a said diversion valve through which milk received from a respective udder quarter is selectively either conveyed to said bulk milk cooling tank via said common discharge line or, if the milk in any of said individual discharge lines is considered unsuitable for human consumption, that milk is conveyed to said receptacle means through said further conduit means, having been diverted by the corresponding said diversion valve in the relevant individual discharge line.

13. A milking plant in accordance with claim 4, comprising a milking robot, said milking robot including means for automatically connecting each of said teat cups to the respective teats of a cow's udder.

* * * * *